US012658526B2

(12) United States Patent
Kraeh

(10) Patent No.: US 12,658,526 B2
(45) Date of Patent: Jun. 16, 2026

(54) BATTERY DEVICE FOR AN AT LEAST PARTIALLY ELECTRICALLY DRIVEN MOTOR VEHICLE

(71) Applicant: Dr. Ing. h.c. F. Porsche Aktiengesellschaft, Stuttgart (DE)

(72) Inventor: Julia Kraeh, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 613 days.

(21) Appl. No.: 18/133,245

(22) Filed: Apr. 11, 2023

(65) Prior Publication Data

US 2023/0327282 A1     Oct. 12, 2023

(30) Foreign Application Priority Data

Apr. 12, 2022     (DE) ..................... 10 2022 108 825.1

(51) Int. Cl.
| | |
|---|---|
| *H01M 50/383* | (2021.01) |
| *B60L 50/64* | (2019.01) |
| *H01M 50/242* | (2021.01) |
| *H01M 50/375* | (2021.01) |
| *B60L 58/26* | (2019.01) |

(52) U.S. Cl.
CPC ........... *H01M 50/383* (2021.01); *B60L 50/64* (2019.02); *H01M 50/242* (2021.01); *H01M 50/375* (2021.01); *B60L 58/26* (2019.02)

(58) Field of Classification Search
None
See application file for complete search history.

(56) References Cited

U.S. PATENT DOCUMENTS

2023/0140500 A1*     5/2023    Balke ................. B01D 46/2411
                                                                        96/243

FOREIGN PATENT DOCUMENTS

DE          102020001540          9/2021

* cited by examiner

*Primary Examiner* — Wyatt P Mcconnell
(74) *Attorney, Agent, or Firm* — Buchanan Ingersoll & Rooney PC

(57) ABSTRACT

A battery device (1) is provided for an at least partially electrically driven motor vehicle. The battery device (1) has a housing device (2) with a housing body (12) and battery cells (11) accommodated in the housing body (12). The battery device (1) includes a safety system (3) for treating gases and particles that arise if a thermal event occurs. The safety system (3) includes at least one load distributing plate (4) of the housing device (2) arranged on the housing body (12). The load distributing plate (4) forms at least one cavity (14) that functions as a gas cooler (13) for cooling the gases produced during the thermal event and as a particle trap (23) for collecting the glowing hot particles produced during the thermal event.

16 Claims, 2 Drawing Sheets

BATTERY DEVICE FOR AN AT LEAST PARTIALLY ELECTRICALLY DRIVEN MOTOR VEHICLE

CROSS-REFERENCE TO RELATED APPLICATION

This application claims priority on German Patent Application No 10 2022 108 825.1 filed Apr. 12, 2022, the entire disclosure of which is incorporated herein by reference,

BACKGROUND

Field of the Invention

The invention relates to a battery device for a motor vehicle driven at least partially electrically, and has at least one housing device with at least one housing body and battery cells accommodated in the housing body. The battery device has at least one safety system for treating gases and particles that can arise if a thermal event occurs.

Related Art

Battery cells of vehicular batteries can become too warm due to damage or an internal short circuit caused by accidents or faults. A damaged vehicular battery can result in a highly exothermic reaction in which further battery cells can overheat and eventually can cause a thermal event, also referred to as a thermal runaway.

Very hot gases and glowing hot particles can be released during a thermal event and, in the absence of further measures, pose a safety risk to the occupants of the vehicle. For example, the gases can ignite outside the battery device upon contact with atmospheric oxygen or due to the glowing hot particles so that a fire ensues.

Some battery devices are equipped with a safety system for treating the gases and particles. One option is to mount an extinguishing device in or near the battery to cool and/or extinguish the gases and particles. However, limited structural space and demands for weight reduction make such extinguishing systems impractical.

DE 10 2020 001 540 A1 discloses a bodyshell structure for an electrically drivable motor vehicle. The bodyshell structure has a treatment device in hollow chambers of the longitudinal beams, transverse beams and side sills. Gases and particles that escape from the drive battery enter the bodyshell structure via an entry therein. The hollow chambers cool the gases and collect and filter the particles.

An object of the invention to provide a structurally simple, reliable safety system for treating gases and particles if a thermal event occurs. The safety system should occupy little structural space and have as little weight as possible to give the vehicle as long an operating range as possible.

SUMMARY OF THE INVENTION

A battery device is provided for an at least partially electrically driven motor vehicle. The battery device comprises at least one housing device with at least one housing body and battery cells accommodated in the housing body. The battery device also comprises at least one safety system for treating gases and particles that could arise in a thermal event and escape from at least one battery cell and/or from the housing body. The safety system has at least one load distributing plate arranged on the housing body and, in some embodiments, abutting the housing body. The load distributing plate comprises at least one cavity that serves as a gas cooler for cooling gases from the battery and/or as a particle trap for collecting the (glowing hot) particles emerging.

The battery device described herein offers many advantages. A significant advantage is offered by the load distributing plate of the safety system. The functional integration of an existing load distributing plate into the safety system enables a constructively uncomplicated and reliable treatment of the escaping gases. In addition, little or no additional structural space or weight is necessitated. Furthermore, the invention avoids the need for additional components for the gas cooler and the particle trap. The existing load distributing plate already is equipped with a cavity to perform a load distribution function in the event of a crash, and the cavity can be used advantageously for treating the gases and particles.

Another advantage is that the load distributing plate is part of the housing device and thus the gas cooler and the particle trap are integrated into the housing device. The treating of the gases and particles therefore takes place directly in the battery device and not merely in its vicinity or even in the bodyshell structure of the motor vehicle. The integration of the gas cooler and the particle trap into the load distributing plate therefore offers a significant advantage over known art. For example, non-metallic materials often are arranged in the components of the bodyshell structure (e.g., sills, longitudinal beams, transverse beams) for crash safety, sound insulation and corrosion protection. Thus, introducing hot gases and glowing hot particles therein can be problematic. However, the invention enables the gases and particles to be treated in the immediate vicinity of the housing body and where they usually would initially escape.

In some embodiments, the load distributing plate is formed at least partially as a deformation element or comprises at least one deformation element. The deformation element converts crash energy into deformation work. In particular, in the event of a crash, the deformation element is deformed purposefully by the load that is conducted into the deformation element, such that the load distributing plate introduces a smaller load into the housing body.

The deformation element may comprise webs and hollow deformation spaces between the webs. This structure also can be configured to be the gas cooler and/or the particle trap. This functional integration is particularly advantageous because the deformation element can have a structure that is well-suited as a gas cooler or particle trap. In particular, the deformation element is a portion of the load distributing plate, where the at least one cavity is formed with the structure made of webs and deformation spaces.

Each web may project from at least one side wall into at least one cavity. The webs may project into the cavity from two opposed side walls of the load distributor plate. The webs may terminate at positions spaced from other (in particular, opposite) side walls. In this regard, the deformation element may comprise at least two sidewalls that delimit the cavity of the load distributing plate. The deformation element can also comprise further differently arranged webs and/or deformation spaces.

The webs that project into the cavity may be offset from one another in a labyrinth-like manner to provide a meandering path for the gas cooler and the particle trap. Thus, gases are cooled and particles are decelerated along the path.

The load distributing plate and the housing body of some embodiments are coupled via at least one flow connection. The flow connection may be open and/or openable in a thermal event so that gases and particles can enter the cavity from the housing body and/or from the battery cells in the interior of the housing body. The flow connection can be in both the housing body and the load distributing plate or in only one of the housing body and the load distributing plate. However, it is possible that no flow connection is provided and that the gases and particles can enter the cavity of the load distributor plate only after, for example, a burn-through of the housing body and/or of a sidewall of the load distributor plate.

The flow connection of some embodiments is configured to open in response to a thermal event. In particular, the flow connection may be closed during normal operation of the battery device or also may be open during normal operation. The opening of the flow connection subject to the thermal event can take place passively and/or actively (e.g., with pressure, heat).

The flow connection comprises at least one outlet opening on the housing body and/or at least one inlet opening in the load distributor plate (in particular towards the cavity). It is possible for the load distributing plate to include an outlet opening via which cooled gases and/or cooled particles are discharged into the surroundings. In normal operation, the outlet opening of the load distributing plate can be closed or open.

In some embodiments, the housing body has at least one rib structure on the outside. In particular, the load distributing plate may comprise a contact surface that faces the rib structure and is at least partially planar. The load distributing plate with the contact surface may abut the rib structure such that a cavity is between the rib structure and the contact surface. This cavity may function as a gas cooler and/or a particle trap. The housing body may comprise at least one flow connection to the cavity. The cavity can be in addition to or alternatively to the cavity in the interior of the load distributing plate.

The load distributing plate may abut and partially contact the housing body. More particularly, the load distributing plate may cover at least at least 50% of one exterior side of the housing body, and preferably at least 75%, and more preferably at least 90%. In some embodiments the load distributing plate fully covers the exterior side or extends beyond the exterior side.

The load distributing plate of some embodiments is fixed to the housing body. Additionally, or alternatively, the load distributing plate can also be fixed to another load-bearing structure of the housing apparatus. Additionally, or alternatively, the load distributing plate can be fixed to a bodyshell structure of the vehicle.

The load distributing plate may be arranged in an intended mounting position in the vehicle between a bodyshell structure of the vehicle and the housing body. In particular, the load distributing plate may be arranged between the bodyshell structure and the housing body such that the gases and particles only reach the bodyshell structure of the vehicle after passing through the gas cooler and the particle trap.

The battery device can comprise at least two load distributing plates. In particular, the load distributing plates may be arranged on opposite exterior sides of the housing body. For example, the load distributing plates may be arranged on two longitudinal sides and/or on two transverse sides of the housing body. Three or four or more housing body sides can also be provided with load distributing plates.

The load distributing plate functions in the event of a crash for two-dimensional distribution of the load conducted into the load distributing plate over a side area of the housing body. In particular, in the event of a crash, the load is distributed through the load distributing plate two-dimensionally on the housing body. The load distributing plate is supported on the housing body. In particular, the load distributing plate of some embodiments has at least two opposing side walls between which the cavity is formed. The load distributing plate can comprise at least two cavities that are in flow connection with one another.

The battery device of some embodiments supplies power to an electric traction drive. In particular, the battery device may be a traction battery or comprises at least one traction battery. The battery cells can be grouped into battery modules within the housing body. It is thus possible that the individual battery modules are accommodated within the housing body by a further housing (e.g., module housing). However, it is also possible that the battery cells are accommodated only by the housing body. For this purpose, the housing body can completely or partially enclose the battery cells. Further components of the housing device may be provided together with the housing body to enclose the battery cells (completely). A lid and/or a bottom can be provided for this purpose. In particular, the housing body surrounds the battery cells at least in the vehicle transverse direction and/or at least in the vehicle longitudinal direction (relative to an intended mounting position in the vehicle). The housing body can also enclose the battery cells above and/or below.

The safety system can additionally comprise further components in addition to the at least one load distributing plate. For example, flow channels, valves, sensors, control devices and/or actuators, or such can be provided for this purpose.

Further advantages and features of the invention follow from the exemplary embodiments that are described below with reference to the accompanying drawings.

DETAILED DESCRIPTION

Figure 1:
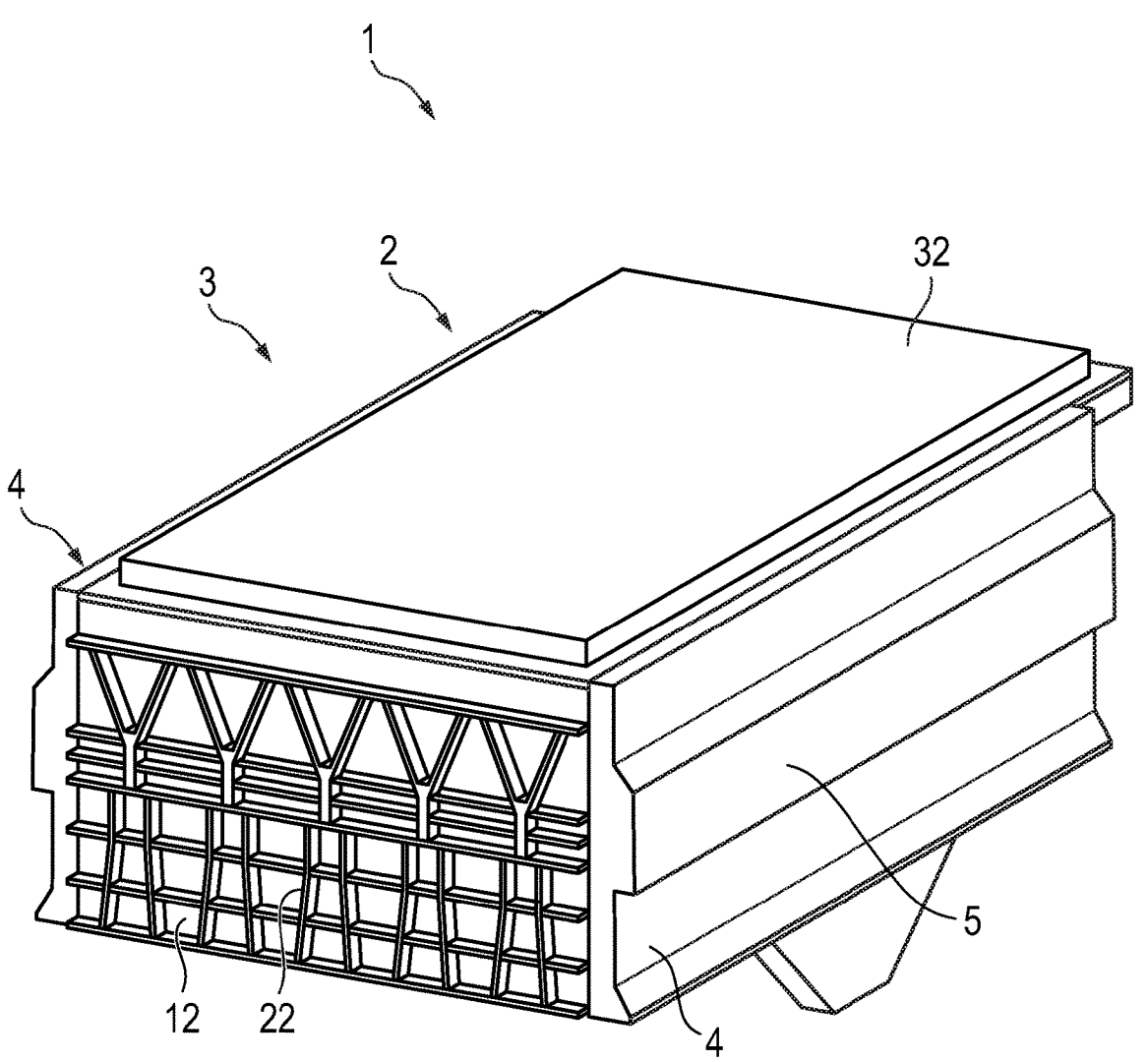
FIG. 1 shows a purely schematic representation of a battery device according to the invention in a perspective view from obliquely above.
Figure 2:
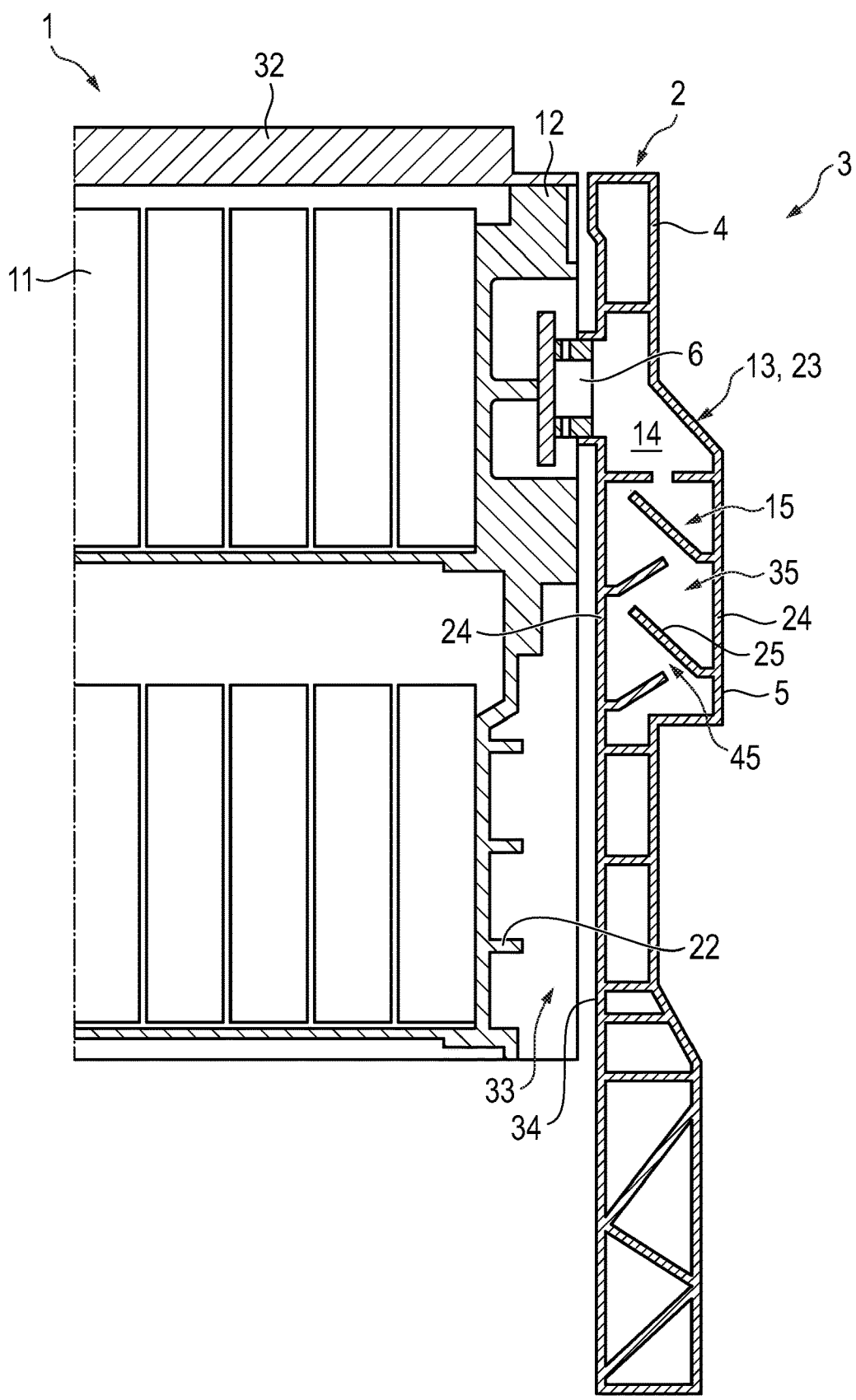
FIG. 2 is a sectional side view of the battery device of FIG. 1.

FIGS. 1 and 2 show a battery device 1 according to an embodiment of the invention. The battery device 1 is configured as a traction battery for a purely electrically or partially electrically driven vehicle. The battery device 1 has a housing device 2 with a housing body 12 and a lid 32. Battery cells 11 are accommodated in the housing body 12.

A load distributing plate 4 is arranged on opposite exterior sides of the housing body 12 (only one of two load distributing plates 4 is shown). The load distributing plate 4 distributes the load over a largest possible surface area of the housing body 12 in the event of a crash. Thus, damage to the housing body 12 and the battery cells 11 by a concentrated load impact or by penetrating components can be counteracted reliably.

The load distributing plate 4 is equipped internally with cavities 14 that are bounded laterally by two opposing side walls 24 extending in the longitudinal direction. The load distributing plate 4 is stiffened between the side walls 24.

To keep the load acting on the housing body 12 as low as possible in the event of a crash, the load distributor plate 4 is configured partially as a deformation element 5. In the event of a crash, the deformation element 5 can deform in a targeted manner so that the crash energy is converted into deformation work.

The deformation element 5 has a structure 15 formed from webs 25 and hollow deformation spaces 35 between the webs 25. The webs 25 project from the side walls 24 into a cavity 14 or into different cavities 14 and terminate at positions spaced from the other side walls 24.

The battery device 1 is equipped with a safety system 3 that allows a treatment of gases and particles, which, in the event of a thermal event, can escape from the housing body 12 and/or the battery cells 11. The safety system 3 is provided by the load distributing plates 4.

For this purpose, the cavity 14 in the load distributor plate 4 is used as a gas cooler for cooling leaked gases and also as a particle trap for collecting escaped hot particles. The gas cooler 13 and the particle trap 23 are integrated functionally and structurally into the load distributing plate 4. Within the cavity 14, the gases cool and the particles decelerate and cool to prevent ignition outside the battery device 1.

The deformation element 5 with its structure 15 also functions to cool the gases and to collect the particles within the load distributing plate 4. A meandering path 45 achieves as long a travel as possible. The path 45 is defined by the webs 25 that are offset from one another in a labyrinth-like manner. This serves for a targeted deformation in the event of a crash and also for the safety system 3. Thus, hot gases can spread out and cool in the deformation spaces 35 already provided in the deformation element 5. The webs 25 already formed in the deformation element 5 also decelerate the particles.

The load distributing plate 4 and the housing body 12 are coupled via a flow connection 6 so that, if a thermal event occurs, the gases and particles from the battery cells 11 can pass through the housing body 12 to the cavity 14 and thus to the gas cooler 13 and the particle trap 23. The flow connection 6 is opened only in a thermal event and is otherwise closed. However, it is also possible that the flow connection 6 shown here is open also in normal operation.

The housing body 12 is equipped with a rib structure 22 on its exterior side. The rib structure 22 can be configured for stiffening and also for improved heat release to the environment. The load distributing plate 4 has a planar contact surface 34 on its side wall 24 facing the rib structure 22 to achieve a cavity 33 between the rib structure 22 and the contact surface 34. This configuration can also be used in addition, or alternatively, to the previously described design to cool the gases and to catch particles. However, it can also be provided that the gas cooler 13 and the particle trap 23 are provided only in the cavities 14 of the load distributing plate 4.

LIST OF REFERENCE SYMBOLS

1 Battery device
2 Housing device
3 Safety system
4 Load distributing plate
5 Deformation element
6 Flow connection
11 Battery cell
12 Housing body
13 Gas cooler
14 Cavity
15 Structure
22 Rib structure
23 Particle trap
24 Side wall
25 Web
32 Lid

6

33 Cavity structure
34 Contact surface
35 Deformation space
45 Path

The invention claimed is:

1. A battery device (1) for an at least partially electrically driven motor vehicle, the battery device (1) including at least one housing device (2) having at least one housing body (12) and battery cells (11) accommodated in the housing body (12), the battery device (1) further including at least one safety system (3) for treating gases and particles that arise during a thermal event, wherein the safety system (3) comprises: at least one load distributing plate (4) arranged on the housing body (12), the load distributing plate (4) including at least one cavity (14) that defines a gas cooler (13) for cooling the gases arising during the thermal event and as a particle trap (23) for collecting the glowing hot particles arising during the thermal event, wherein the at least one housing body (12) includes a first cavity in which the battery cells (11) are housed, and a second cavity for collecting gases, wherein the second cavity is connected to an inlet port that is defined on a side surface of the plate (4), and wherein a side wall of the housing body (12) delimits the first and second cavities.

2. The battery device (1) of claim 1, wherein the load distributing plate (4) is configured at least partially as a deformation element (5) for converting crash energy into deformation work, and wherein the deformation element (5) comprises a structure (15) of webs (25) and deformation spaces (35) located between the webs (25), the structure (15) being configured to define the gas cooler (13) and the particle trap (23).

3. The battery device (1) of claim 2, wherein each of the webs (25) projects from one side wall (24) of the load distributing plate (4) into the at least one cavity (14) and terminates at a position spaced from at least one other side wall (24) of the load distributing plate (4).

4. The battery device (1) of claim 3, wherein the webs (25) project offset from one another in a labyrinth-like manner into the cavity (14) so that a meandering path (45) is provided for the gas cooler (13) and the particle trap (23).

5. The battery device (1) of claim 1, wherein the load distributing plate (4) and the housing body (12) are coupled via at least one flow connection (6) and wherein the flow connection (6) is open and/or openable at least during the thermal event, so that gases and particles from the housing body (12) can enter the cavity (14) via the flow connection (6).

6. The battery device (1) of claim 1, wherein the housing body (12) has at least one rib structure (22), and wherein the load distributing plate (4) comprises a planar contact surface (34) facing toward the rib structure (22), such that a cavity structure (33) is formed between the rib structure (22) and the contact surface (34), the cavity structure (33) defining the gas cooler (13) and a particle trap (23).

7. The battery device (1) of claim 1, wherein the load distributing plate (4) is in abutting contact with the housing body (12).

8. The battery device (1) of claim 1, wherein the load distributing plate (4) covers at least 90% of at least one exterior side of the housing body (12).

9. The battery device (1) of claim 1, wherein the load distributing plate (4) is fixed to the housing body (12).

10. The battery device (1) of claim 1, the at least one load distributing plate (4) comprises at least two load distributing plates (4) arranged on opposite exterior sides of the housing body (12).

11. The battery device (1) of claim 1, wherein one side of the first cavity is delimited by a first side of the side wall, and one side of the second cavity is delimited by a second side of the side wall that is opposite the first side of the side wall.

12. The battery device (1) of claim 1, further comprising a flow connector (6) that is fluidly coupled between the second cavity and the inlet port on the side surface of the plate (4) to deliver gases from the second cavity into the cavity (14) of the plate (4).

13. The battery device (1) of claim 12, wherein the flow connector (6) is directly connected to the inlet port on the side surface of the plate (4) and an inlet port on the housing body (12).

14. The battery device (1) of claim 12, wherein the flow connector (6) includes (i) a central passage for the delivery of gases from the second cavity into the cavity (14) of the plate (4) and (ii) a plurality of passages extending orthogonally from the central passage.

15. The battery device (1) of claim 12, wherein the flow connector (6) is normally closed and opened only in a thermal event.

16. The battery device (1) of claim 12, wherein the inlet port on the side surface of the plate (4) is positioned in direct contact with the housing body (12).

* * * * *